6768X
G. Page,
Horse Power.
Patented Sep. 28, 1831.
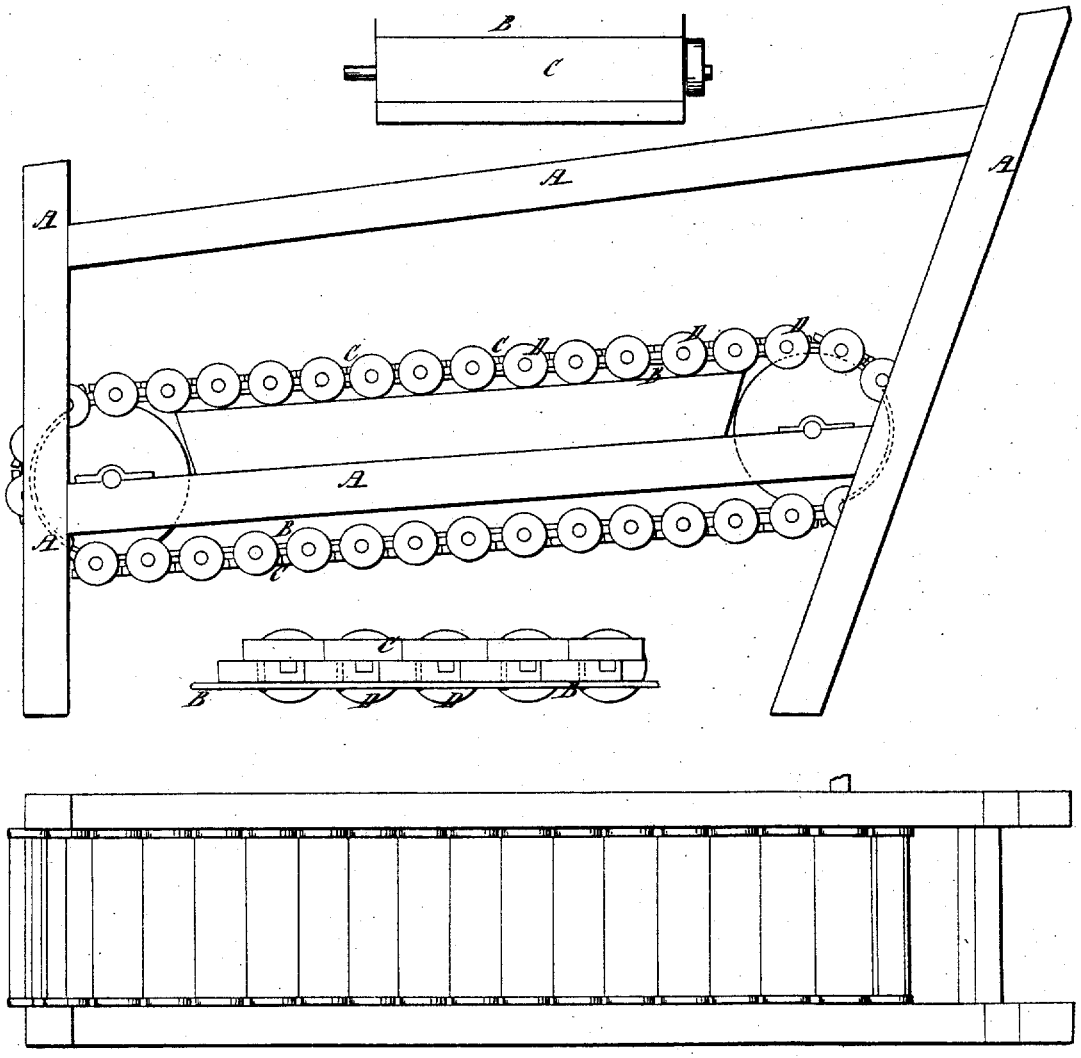
AM. PHOTO-LITHO. CO. N.Y. (OSBORNE'S PROCESS)

67683 Sept. 28. 1831

George Page of Keene, New Hampshire
Letters Patent

The Schedule referred to in these Letters Patent and making part of
the same containing a description in the words of the said George Page
himself of his improvement in the application of horse, and other an-
imal Power to ^move machinery To all to whom these presents shall come, Be it known that I
George Page of Keene in the County of Cheshire and State of New Hamp-
shire, have invented a new and useful improvement in the application
of Horse Power, to move machinery for sawing wood, propelling boats
grinding grain and other purposes, and that the following is a full
and exact description of the construction and operation of the said
improvement as invented by me The improvement consists in the construction and use of a band
which may be called an inclined band. It may be constructed for
one Horse or for as many Horses as the machinery to be moved may
require. When intended for one Horse it may be made and used
as follows. In the first place make a band of leather about eighteen
inches wide, and measuring its whole length, from seventeen to twen-
ty feet long. It may be of one thickness or of two or three thicknes-
ses, thonged together. If of one thickness two narrow strips two or
three inches wide should be thonged to each edge on the outward side
through which the bolts afterwards mentioned are to be inserted.
This side should then be covered its whole length with pieces of plank
or board about two inches thick about six inches wide, and about
six inches longer than the band is wide. Each piece should be fas-
tened to the band by bolts, the bolts passing through the edges of the
band, through the strips of leather, if strips be used, and through
the middle of the pieces of plank or board. An axle somewhat
longer than these pieces is bedded into and strongly bolted to each, on
the outward side, and within an inch or two of the forward edge.
On each end of every axle is placed a cast iron wheel, in diameter Drawing 6768x Sept 28, 1831 about a quarter of an inch less than the width of the pieces of plank and [illegible] made strong enough to bear a horse and the band. Over these pieces of plank, are placed and fastened by bolts or screws, another set of the same size and so placed as that the edges shall be exactly over the middle or centre of the axles. By placing this outward set thus, the band is made more firm and steady under the tread of the horse. The band passes round two cylinders or drums, whose axles are horizontal. These cylinders are about twenty two inches in diameter, nearly the same length as the planks, and are placed at a sufficient distance to take up the band. One which may be called the forward cylinder, is raised one foot a little more or less higher than the other. To either end of either axle passing through these cylinders, is attached a gear of proper size to produce the speed required. At each end of the arbor or axle of either of ~~either~~ of the cylinders or drums, a screw should be so placed that the arbor may be moved forward or backward at pleasure whenever it may be necessary to tighten or loosen the band For the cast iron wheels aforesaid to run on, a railway is placed the rails extending from the centre of one cylinder to the centre of the other, having the same inclination as the band, and placed at a proper distance from each other for the wheels to run on. In order to keep the band in its place, these rails, or the wheels should have grooves or Rabbets. The height of the rail way must be such that that part of the band which is uppermost, when it revolves will not sag.

The horse is placed on this band, his head towards the forward cylinder. His harness must be similar, to a chaise harness.

The whipple tree is attached to a staple firmly fastened behind him, and the breeching, which is essential is fastened to something at his sides or forward as may be most convenient. The height of the staple is important and must be regulated by the height of the horse. It may be placed a little lower than the ordinary line of draught. Bars should be placed on each side of the horse to keep him as near as may be on the middle of the middle of the band. The stepping of the Horse assisted by his weight moves the band, and the moving of the band causes the cylinders to revolve and thus gives motion to the machinery The dimensions above given may be larger, or smaller according to the pleasure of the builder, or to the power requisite to move the machinery, a proper proportion being observed.

When two or more Horses are to be used the band may be made wide, and the horses placed abreast of each other, or it may be made long and one placed behind another. Instead of leather chains may be used, and cast iron wheels may be substituted for cylinders or drums, with cogs to play into the links of the chains, And instead of Horses other animal power may be used.

The machine may be so constructed that one or both of the cylinders, and one or both of the ends of the railway may be raised or lowered at pleasure. By increasing the inclination of the band to a certain extent, the power of the Horse will be increased, and by laying the band level when the machine is stopped the horse will be enabled to stand at ease, by increasing the diameter of the wheels which support the band the power of the horse will be increased in proportion, but in that case the planks must be made proportionably wider The improvement which I claim as my invention, and for which I ask an exclusive privilege, is in the application of Horse or other animal power to move machinery for sawing wood propelling boats, grinding grain and for other purposes by an inclined Band operating in manner above described Witnesses
C. Dunbar
S. Hale George Page

[illegible]

(1170 Words)

([illegible] Sept 28. 1831)